US012617257B2

(12) United States Patent　　(10) Patent No.:　US 12,617,257 B2
Woo et al.　　　　　　　　　　　　(45) Date of Patent:　　May 5, 2026

(54) VEHICLE VISOR

(71) Applicant: Rivian IP Holdings, LLC, Plymouth, MI (US)

(72) Inventors: Kyunghwan Woo, Anaheim, CA (US); Gangadhar Anchuri, Eastvale, CA (US)

(73) Assignee: Rivian IP Holdings, LLC, Irvine, CA (US)

(*) Notice: Subject to any disclaimer, the term of this patent is extended or adjusted under 35 U.S.C. 154(b) by 497 days.

(21) Appl. No.: 18/173,297

(22) Filed: Feb. 23, 2023

(65) Prior Publication Data

US 2024/0286466 A1　Aug. 29, 2024

(51) Int. Cl.

| | |
|---|---|
| *B60J 3/02* | (2006.01) |
| *B32B 3/02* | (2006.01) |
| *B32B 5/02* | (2006.01) |
| *B32B 5/06* | (2006.01) |
| *B32B 5/18* | (2006.01) |
| *B32B 5/24* | (2006.01) |
| *B32B 7/12* | (2006.01) |
| *B32B 37/10* | (2006.01) |
| *B32B 37/12* | (2006.01) |
| *B32B 37/18* | (2006.01) |
| *B32B 37/30* | (2006.01) |
| *B32B 38/00* | (2006.01) |

(52) U.S. Cl.
CPC .............. *B60J 3/0278* (2013.01); *B32B 3/02* (2013.01); *B32B 5/02* (2013.01); *B32B 5/073* (2021.05); *B32B 5/18* (2013.01); *B32B 5/245* (2013.01); *B32B 7/12* (2013.01); *B32B 37/10* (2013.01); *B32B 37/12* (2013.01); *B32B 37/18* (2013.01); *B32B 37/30* (2013.01); *B32B 38/00* (2013.01); *B32B 38/0012* (2013.01); *B32B 2038/008* (2013.01); *B32B 2605/003* (2013.01)

(58) Field of Classification Search
CPC ......... B60J 3/0278; B60J 3/0204; B32B 3/02; B32B 5/02; B32B 5/073; B32B 5/18; B32B 5/245; B32B 7/12; B32B 37/10; B32B 37/12; B32B 37/18; B32B 37/30; B32B 38/00; B32B 38/0012; B32B 2038/008; B32B 2605/003
USPC ........................................................ 296/97.1
See application file for complete search history.

(56) References Cited

U.S. PATENT DOCUMENTS

| | | | | |
|---|---|---|---|---|
| 2,901,038 | A | * | 8/1959 | Herr ........................ B60J 3/0278 160/354 |
| 3,405,969 | A | * | 10/1968 | Creel ..................... B60J 3/0278 296/97.1 |

(Continued)

*Primary Examiner* — Jason S Morrow
(74) *Attorney, Agent, or Firm* — Foley & Lardner LLP

(57) ABSTRACT

Systems and methods of sun visor construction are provided. The method can include obtaining a section of material from a piece of material used to form a headliner of a vehicle. The method can include forming a first portion of material and a second portion of material from the section of material. The method can include stacking the first portion of material with the second portion of material. The method can include coupling a component with the first portion of material and the second portion of material to form a visor of the vehicle, the component covering an outer edge of the first portion of material and an outer edge of the second portion of material.

20 Claims, 9 Drawing Sheets

(56)  References Cited

U.S. PATENT DOCUMENTS

| | | | | |
|---|---|---|---|---|
| 4,227,241 | A * | 10/1980 | Marcus | B60J 3/0282 362/135 |
| 5,011,211 | A * | 4/1991 | Svensson | B60Q 3/252 296/97.1 |
| 5,031,950 | A * | 7/1991 | Miller | B60J 3/0278 296/97.1 |
| 5,148,588 | A * | 9/1992 | Prillard | B60J 3/0278 29/451 |
| 5,327,633 | A * | 7/1994 | Riddle, Jr. | B60J 3/02 29/402.09 |
| 5,678,879 | A * | 10/1997 | Mailander | B60J 3/0278 296/97.1 |
| 5,779,298 | A * | 7/1998 | Smelser | B60J 3/0278 296/97.1 |
| 5,887,933 | A * | 3/1999 | Peterson | B60J 3/0278 296/97.1 |
| 5,975,616 | A * | 11/1999 | Eple | B60J 3/0278 296/97.1 |
| 6,302,467 | B1 * | 10/2001 | Crotty, III | B60J 3/0278 296/97.1 |
| 6,513,855 | B2 * | 2/2003 | Zenisek | B60J 3/0208 296/97.1 |
| 6,527,328 | B2 * | 3/2003 | Crotty, III | B60J 3/0278 296/97.1 |
| 6,641,197 | B1 * | 11/2003 | Hobson | B60J 3/0278 296/97.1 |
| 7,192,075 | B1 * | 3/2007 | Asai | B29C 66/242 296/97.1 |
| 7,222,914 | B2 * | 5/2007 | Ogawa | B60J 3/0278 296/97.1 |
| 7,416,239 | B2 * | 8/2008 | Lanser | B60J 3/0278 296/97.1 |
| 7,918,491 | B2 * | 4/2011 | Olep | B60J 3/0208 296/97.1 |
| 8,739,442 | B2 * | 6/2014 | Shape | B60R 11/00 40/737 |
| 8,870,259 | B2 * | 10/2014 | Wieczorek | B60J 3/0278 296/97.1 |
| 11,926,137 | B2 * | 3/2024 | Begg | B32B 27/08 |
| 2011/0012387 | A1 * | 1/2011 | Cicholski | B60J 3/0278 296/97.1 |
| 2015/0109751 | A1 * | 4/2015 | Mochizuka | G02F 1/161 361/803 |
| 2015/0314737 | A1 * | 11/2015 | Zimmer | B32B 3/30 29/428 |
| 2024/0286466 | A1 * | 8/2024 | Woo | B32B 3/02 |

* cited by examiner

900

VEHICLE VISOR

INTRODUCTION

A vehicle, such as an electric vehicle, can include an interior for occupancy by drivers, passengers, or other personnel. The interior can include seats, passenger seats, compartments, and other components for occupants of the vehicle to utilize.

SUMMARY

This disclosure is generally directed to techniques for constructing a visor, e.g., a sun visor, for a vehicle. The manufacture of sun visors of a vehicle can be integrated with the manufacture of the headliner of the vehicle. The present solution can include cutting pieces out of scrap headliner material to form sun visors for the vehicle, or another vehicle. This integration of processes can reduce the amount of time, tools, and other material used to manufacture the headliner and the sun visors independently, thereby reducing a carbon footprint associated with the manufacturing of vehicles. Since the pieces of material cut from the headliner for the sun visors may have rough edges, or edges that expose the inner layers of the material, the sun visor can include a component, trim, edge, or apparatus that hides or covers the rough edges. The component can be a flexible material that is applied around an outer edge of the pieces of material. For example, the component can be an extruded thermoplastic elastomer (TPE). For each sun visor, two pieces of the material can be stacked and fixed together (e.g., via a glue or adhesive), and the component can be applied around an outer edge of the two pieces. The component can hide a rough or exposed edge of the sun visor. The component can be a rigid material that the pieces of material are inserted into. For example, the component can be an injection molded polypropylene (PP). The component can be or include a plate that includes a bezel, edge, or lip around a portion or an entirety of an outer edge or boundary of the plate. For example, at least one piece of material can be coupled with the plate. A first piece of material can be inserted, slid, or disposed on a top surface of the plate. The first piece of material can be fixed to the plate by the lips on the top surface of the plate. A second piece of material can be inserted, slid, or disposed on a bottom surface of the plate and can be fixed to the plate by the lips on the bottom surface of the plate.

At least one aspect is directed to a method. The method can include obtaining a section of material from a piece of material used to form a headliner of a vehicle. The method can include forming a first portion of material and a second portion of material from the section of material. The method can include stacking the first portion of material with the second portion of material. The method can include coupling a component with the first portion of material and the second portion of material to form a visor of the vehicle, the component covering an outer edge of the first portion of material and an outer edge of the second portion of material.

At least one aspect is directed to a visor. The visor can include a first portion of material including a first outer edge wherein the material is compressed. The visor can include a second portion of material including a second outer edge wherein the material is compressed. The first portion of material is stacked on the second portion of material to align the first outer edge with the second outer edge.

At least one aspect is directed to a method. The method can include obtaining a section of material from a piece of material used to form a headliner of a vehicle. The method can include forming a first portion of material and a second portion of material from the section of material. The method can include stacking the first portion of material with the second portion of material. The method an include coupling a component with the first portion of material and the second portion of material to form a visor of the vehicle, the component covering an outer edge of the first portion of material and an outer edge of the second portion of material. The method can include installing the visor and the headliner in the vehicle.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
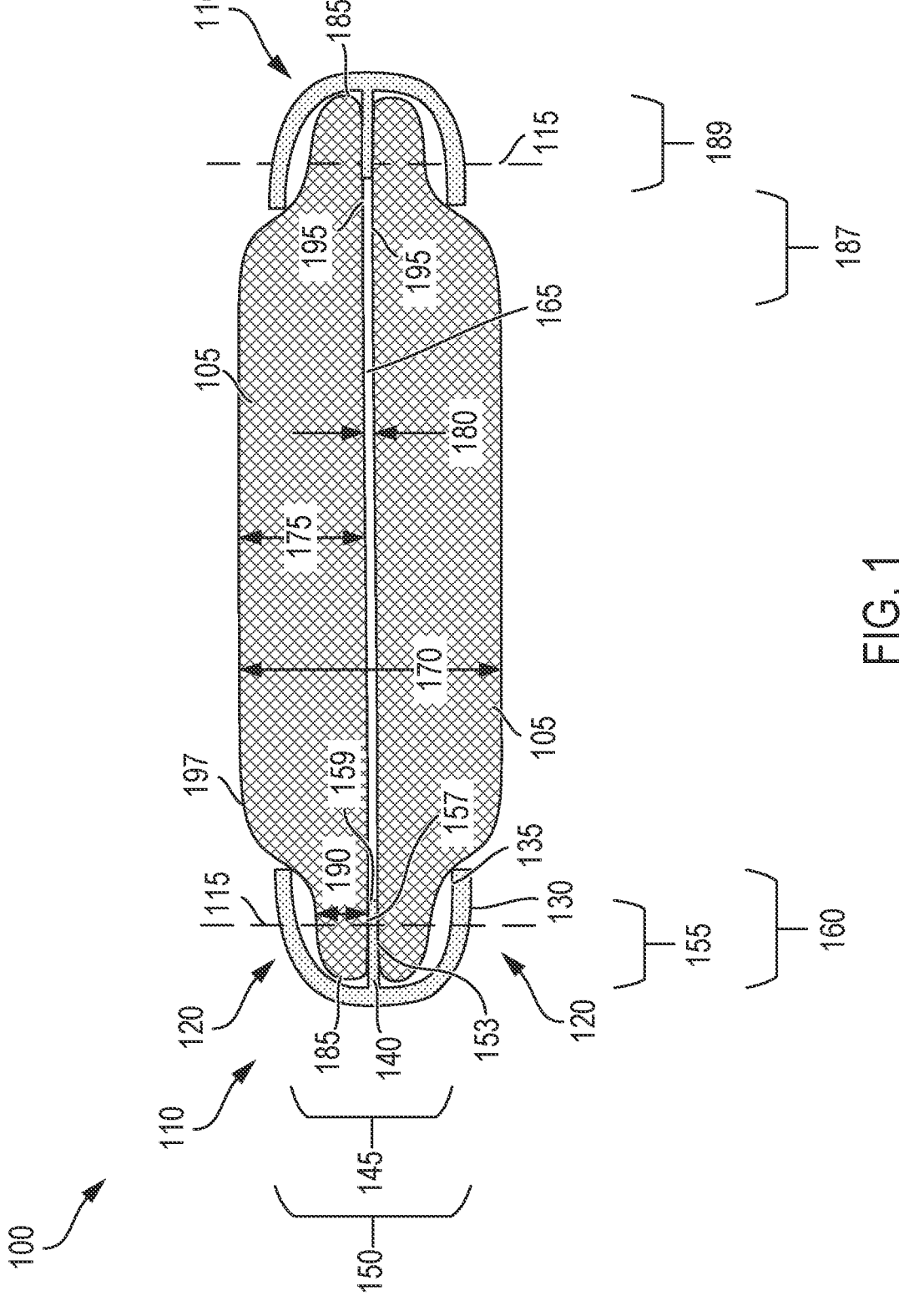
FIG. 1 is an example visor including a first piece of material and a second piece of material.

Following below are more detailed descriptions of various concepts related to, and implementations of, methods, apparatuses, and systems for a sun visor of a vehicle.

This disclosure is generally directed to techniques for constructing a visor, e.g., a sun visor, for a vehicle. A vehicle can include a material that covers interior surfaces of the vehicle. For example, the material can cover a ceiling, walls, or a floor of the vehicle. The material can be a headliner material. The material can be cut to form openings in the vehicle, e.g., sunroofs, windows, or doors. Portions or sections of the material that are cut out of the material to form the openings may be scrap that is discarded. The amount of material cut out from the material and discarded for manufacturing a single vehicle can be substantial (e.g., ten square feet of material, fifteen square feet of material, thirty square feet of material). Furthermore, the manufacture of the headliner of the vehicle and manufacture other components of the vehicle, e.g., a sun visor, may be separate. By having separate processes to manufacture the headliner in the vehicle and to create the sun visor, manufacturing or assembly time may be increased and waste material may be excessive (e.g., ten square feet of waste material, fifteen square feet of waste material, thirty square feet of waste material).

To solve these and other technical problems, the present solution can integrate the manufacture of sun visors of a vehicle with the manufacture of the headliner of the vehicle. The present solution can include cutting pieces of material out of scrap headliner material to form sun visors for the vehicle, or another vehicle. When the headliner is manufactured for the vehicle, the headliner can be cut to form openings in the headliner and edges of the headliner can be compressed. Compressing and cutting sections of the headliner material for the sun visor can be performed during the compressing and cutting of the headliner material to manufacture the headliner. This integration of processes can reduce the amount of time, tools, and other material that would needed to manufacture the headliner and the sun visors separately.

Since the pieces of material cut from the headliner for the sun visors may have rough edges, or edges that expose the inner or bottom layers of the material, the sun visor can include a component, trim, edge, lip, or apparatus that hides or covers the edges of the pieces of material. The component can be a flexible material that is applied around an outer edge (e.g., an outer edge compressed and cut during the compressing and cutting on the headliner) of the pieces of material. For example, the component can be an extruded thermoplastic elastomer (TPE). For each sun visor, two portions (e.g., two pieces or one piece folded onto itself) of the material can be stacked and fixed together (e.g., via a glue or adhesive), and the component can be applied around an outer edge of the two portions. The component can hide a rough or exposed edge of the pieces of material of the sun visor and/or provide structure for the portions.

The component can be a rigid material that the pieces of material are inserted into. For example, the component can be an injection molded polypropylene (PP). The component can be a plate that includes a bezel, edge, or lip around on outer surface of the plate. For example, at least one piece of material can be coupled with the plate. A first piece of material can be inserted, slid, or disposed on a top surface of the plate. The first piece of material can be fixed to the plate by a lip on the top surface of the plate. A second piece of material can be inserted, slid, or disposed on a bottom surface of the plate and can be fixed to the plate by a lip on the bottom surface of the plate.

The visor may not include a stiffening rod. The visor may be rigid or stiff in view of the double stack of material or the component coupled to the material. The visor may be rigid or stiff in view of one or more substrate layers in the first or second pieces of material. Therefore, the visor may not include or may lack a stiffening rod because the material from the reused headliner can provide structural integrity or support to the visor. Because the visor does not include a stiffening rod, the weight of the visor can be reduced. For example, the visor of the present technical solution can be 5% lighter, 10% lighter, 15% lighter, or 20% lighter or more as compared to a visor that uses a stiffening rode. By providing a lighter sun visor with satisfactory structural integrity, the present technical solution can reduce an overall the weight of a vehicle, thereby reducing the amount of energy used by the vehicle to drive or accelerate or increasing the driving range of the vehicle on a single charge.

FIG. 1, among others, illustrates an example visor 100 including a first piece or portion of material 105 and a second piece or portion of material 105. FIG. 1 is a cross-section view of the visor 100. The visor 100 can be a sun visor, a sun blocker, a screen, a sun shade, a light stopper, a sun reducer, a sun guard. The visor 100 can include at least one portion of material 105. The visor 100 can include one, two, three, or any other number of portions of material 105. The material 105 can be scrap material. The material 105 can be scrap material resulting from manufacturing or assembly processes of a vehicle. For example, during manufacturing of a vehicle, an interior material can be applied to a ceiling, a wall, or a floor of a vehicle. The interior material can be a headliner. However, when the interior material is cut to form doors, windows, sun roofs, moon roofs, windshield areas, or other areas, the pieces cut from the interior material can be scrap. The portions of material 105 can be scrap material, or can be cut from scrap material. For example, the portion of material 105 can be cut directly from a headliner. For example, the portion of material 105 can be cut from a section of material cut from the headliner when forming an opening in the vehicle.

The first portion of material 105 and the second portion of material 105 can be the same shape, or substantially the same shape and the same size. For example, the first portion of material 105 and the second portion of material 105 can have the same dimensions. However, the first portion of material 105 and the second portion of material 105 can have different dimensions, sizes, or shapes. The first portion of material 105 and the second portion of material 105 can have the same width, length, or thickness. The portion of material 105 can have a thickness 175. The thickness 175 can be a thickness between an inner or bottom side or surface 195 and an outer side or surface 197 of the portion of material 105. The thickness 175 can be five to six millimeters wide. The thickness 175 can be four to seven millimeters wide. The thickness 175 can be less than four millimeters wide. The thickness 175 can be more than seven millimeters wide. The thickness 175 can be a greatest thickness of the portion of material 105. The portion of material 105 can have a compressed portion 189 that has a thickness 190. The thickness 190 can be less than the thickness 175. The thickness 175 can be greater than the thickness 190.

The compressed portion 189 can be a section around an outer edge of the portion of material 105 that is compressed to a thickness 190. For example, a press (e.g., a hydraulic press, a water press, a water jet, a hand operated press, a head based press) can compress an edge 185 around some or all sides of the portion of material 105. For example, the press can be applied from an edge or outer edge 185 of the material 105 a distance towards an opposite edge 185 of the material 105 or a center of the portion of material 105 to form the compressed portion 189. The width of the compressed portion 189, e.g., a distance from the edge 185 towards the opposite edge 185 or center of the portion of material 105, can be four to five millimeters. The width of the compressed portion 189 can be three to six millimeters. The width of the compressed portion 189 can be less than three millimeters. The width of the compressed portion 189 can be greater than six millimeters. The upper and lower lips 120 can extend a distance 160 further than the width of the compressed portions 189. For example, the upper and lower lips 120 can extend from an end of the flat section 140 or from the edge 185 of the portions of material 105 a distance 160 to ends of the upper and lower lips 120. For example, the upper lip 120 can extend a distance 160 to an end of the upper lip 120. The lower lip 120 can extend a distance 160 to an end of the lower lip 120. The distance 160 can be five to six millimeters. The distance 160 can be four to seven millimeters. The distance 160 can be less than four millimeters. The distance 160 can be greater than seven millimeters. The first piece of material 105 can include a first outer edge 185. The second piece of material 105 can include a second outer edge 185.

The compressed portion 189 can extend from an edge 185 to a curved section 187. The curved section 187 can couple a flat outer surface 197 of the piece of material of the width 175 to the compressed portion 189. The curved section 187 can be an s-shaped curve, an inverted s-shaped curve, a flat line, a parabolic curve, a logarithmic curve. One, two, three, or four sides of the portion of material 105 can include the compressed portion 189 and the curved section 187. For example, the compressed portion 189 and the curved section 187 can extend completely, or entirely, around an outer edge 185 of the portion of material 105. The portion of material 105 can be integrally formed. For example, the flat surface 197, the curved portion 187, and the compressed portion 189 can be integrally formed.

The first portion of material 105 and the second portion of material 105 can be stacked. The first portion of material 105 and the second portion of material 105 can be separated by a width 180. The width 180 can be millimeter to two millimeters. The width 180 can be half a millimeter to two and a half millimeters. The width 180 can be less than half a millimeter. The width 180 can be greater than two and a half millimeters. A glue or adhesive can be applied to bottom surfaces 195 of the first portion of material 105 and the second portion of material 105. The adhesive can be an epoxy, a cyanoacrylate, a polyvinyl acetate, or a rubber cement. The glue or adhesive can fill the space between the surfaces 195 of the first portion of material 105 and the second portion of material 105. The width 180 defining the space between the first portion of material 105 and the second portion of material 105 can be formed or defined by the glue or adhesive.

The first portion of material 105 and the second portion of material 105 can be stacked to mirror each other across a boundary or plane formed by the width 180. For example, the bottom surfaces 195 of the first portion of material 105 and the second portion of material 105 can be coupled (e.g., glued or adhered) together and the top surfaces 197 of the first portion of material 105 and the second portion of material 105 can be disposed opposite each other. The bottom surfaces 195 of the first portion of material 105 and the second portion of material 105 can be separated by the width 180 while the top sides 197 of the first portion of material 105 and the second portion of material 105 can be separated by the width 170. For example, the bottom surfaces 195 of the first portion of material 105 and the second portion of material 105 can be closer to each other than the top sides 197 of the first portion of material 105 and the second portion of material 105. The width 170 can be ten to twelve millimeters wide. The thickness 175 can be eight to fourteen millimeters wide. The thickness 175 can be less than eight millimeters wide. The thickness 175 can be more than fourteen millimeters wide.

The edges, outer edges, ends, or boundaries 185 of the first portion of material 105 and the second portion of material 105 can be aligned. For example, the edge 185 of the first portion of material 105 and the second portion of material 105 can be aligned on a plane defining the width 170 of the visor 100. The plane can be perpendicular with the top sides 197 of the first portion of material 105 or the second portion of material 105 or perpendicular with the bottom surfaces 195 of the first portion of material 105 or the second portion of material 105. The edges 185 can surround an entire outer side of the first portion of material 105 and the second portion of material 105 (e.g., around a first lateral side, a second lateral side, a third lateral side, a fourth lateral side) and correspond with each other around part, or all of the entire outer sides of the first piece of material 105 and the second piece of material 105.

When assembled in the visor 100, the compressed portions 189 of the first piece of material 105 and the second piece of material 105 can be opposite each other. For example, the compressed portion 189 of the first portion of material 105 can be compressed towards the bottom surface 195 of the second portion of material 105. The compressed portion 189 of the second portion of material 105 can be compressed towards the bottom surface 195 of the second piece of material.

The outer edges 185 of the first portion of material 105 and the second portion of material 105 can be rough because the first portion of material 105 and the second portion of material 105 may be cut from a headliner of a vehicle. The outer edges 185 of the first portion of material 105 and the second portion of material 105 can expose inner or bottom materials of the first piece of material 105 and the second portion of material 105. The component 110 can be applied around the outer edges 185 of the first portion of material 105 and the second portion of material 105. The component 110 can hide the rough or exposed edges 185 of the first piece of material 105 and the second portion of material 105. The component 110 can couple the first portion of material 105 and the second portion of material 105. For example, the component 110 can apply a compressing or frictional force against the curved portions 187 or the compressed portions 189 to couple the first portion of material 105 and the second portion of material 105.

The component 110 can be or include a trim, a bezel, a lip, an extruded thermoplastic elastomer, a polymer, a rubber, a metal (e.g., aluminum, brass, copper), or wood (e.g., oak, maple, cherry). The component 110 can be a rigid material or a flexible material. The component 110 can be a stiffening component coupled with the first portion of material 105 and the second portion of material 105 to cover the first outer edge 185 of the first portion of material 105 and the outer edge 185 of the second portion of material 105.

The component 110 can surround some or all of the sides of the visor 100. For example, the component 110 can cover the edge 185 on a first lateral side, a second lateral side, a third lateral side, or a fourth lateral side. The component 110 can be a single component that covers some or all of the sides and flexes or bends around corners of the visor 100. The component 110 can include multiple sub-components, e.g., with each sub-component disposed on one side of the visor 100, e.g., a first sub-component on a first lateral side of the visor 100, a second sub-component on a second lateral side of the visor 100, a third sub-component on a third lateral side of the visor 100, a fourth sub-component on a fourth lateral side of the visor 100.

The component 110 can include a curved shape. The component 110 can be a "c" or "e" shaped component. The component 110 can include a first lip 120 and a second lip 120. The first lip 120 can extend from a flat section 140 of the component 110 towards the first portion of material 105 and away from the second portion of material 105. The second lip can extend from the flat section 140 away from the component 110 and towards the second portion of material 105. For example, the first lip 120 and the second lip 120 can extend in opposite directions. The first lip 120 and the second lip can curve towards a plane formed by the space 165. For example, ends of the first lip 120 and the second lip 120 can extend towards being parallel with the plane 165 or each other.

The first or upper lip 120 can touch, make contact with, couple with, fix to, or meet the compressed portion 189 or the curved portion 187 of the first portion of material 105. The second or lower lip 120 can touch, make contact with, couple with, fix to, or meet the compressed portion 189 or the curved portion 187 of the second portion of material 105. The first lip 120 can apply a frictional or compressing force to the compressed portion 189 or the curved portion 187 of the first portion of material 105. The second lip 120 can apply a frictional or compressing force to the compressed portion 189 or the curved portion 187 of the second portion of material 105. For example, the component 110 can include an inner side 135 and an outer side 130. The inner side 135 of the first portion of material 105 can touch, make contact with, couple with, fix to, or meet the compressed portion 189 or the curved portion 187 of the first portion of material 105. The inner side 135 of the second portion of material 105 can touch, make contact with, couple with, fix to, or meet the compressed portion 189 or the curved portion 187 of the first portion of material 105.

An inner side 135 of the upper lip 120 and an inner side 135 of the lower lip 120 can be separated by a distance 145. An outer side 130 of the upper lip 120 and an outer side 130 of the lower lip 120 can be separated by a distance 150. The distance 150 can be greater than the distance 145. The distances 145 and 150 can be a greatest or maximum distances. For example, distances between the inner sides 135 of the lips 120 and the outer sides 130 of the lips 120 can increase or decrease over a distance. For example, the distance between the inner sides 135 can increase over a distance 160 from the edge 185 or from an end of the flat section 140 to a maximum or greatest distance 145. The distance can increase according to a linear function, a polynomial function, a logarithmic function. For example, the distance between the outer sides 150 can increase over a distance 160 from the edge 185 or from an end of the flat section 140 to a maximum or greatest distance 150. The distance can increase according to a linear function, a polynomial function, a logarithmic function.

The distance 145 can be seven to ten millimeters wide. The distance 145 can be six to eleven millimeters wide. The distance 145 can be less than six millimeters wide. The distance 145 can be more than eleven millimeters wide. The distance 145 can be eight to eleven millimeters wide. The distance 145 can be seven to twelve millimeters wide. The distance 145 can be less than seven millimeters wide. The distance 145 can be more than twelve millimeters wide.

The first lip 120, the second lip 120, and the flat section 140 can be separate components or can be integrally formed. The flat section 140 can extend into the space 165. The flat section 140 can extend a distance 155. The distance 150 can be four to five millimeters. The distance 150 can be three to six millimeters. The distance 150 can be less than four millimeters. The distance 150 can be greater than six millimeters. The flat section 140 can extend from the inner surface 135 of the lips 120. The flat section 140 can extend in a direction parallel to the bottom surface 195 of the first portion of material 105 or the bottom surface 195 of the second portion of material 105. For example, the flat portion 140 can be shaped as a rectangular solid, a prism, a triangular solid, a half circle solid, a solid arc. A top surface 157 and bottom surface 153 of the flat portion 140 can contact the bottom surfaces 195 of the first portion of material 105 and the bottom surfaces 195 of the second portion of material 105. For example, the top surface 157 can couple with the bottom surface 195 of the first portion of material 105. For example, the bottom surface 153 can couple with the bottom surface 195 of the second portion of material 105. The top surface 157 can be glued or adhered to the bottom surface 195 of the first portion of material 105. The bottom surface 153 can be glued or adhered to the bottom surface 195 of the second portion of material 105. An end 159 can contact glue or adhesive in the space 165.

A component can be inserted along the boundary 115 to couple the first portion of material 105, the component 110, and the second portion of material 105. For example, the component can be a thread stitched along the boundary 115, a staple, a fastener, a snap, a nail, or a bolt. The component can be inserted through the first lip 120, the first portion of material 105, the flat section 140, the second portion of material 105, and the second lip 120. For example, the component can be inserted through the compressed portion 189 of the first portion of material 105 and the compressed portion 189 of the second portion of material 105. The component can compress the inner surface of the first lip 120 against a surface of the compressed portion of the first portion of material 105. The component can compress the bottom surface 195 of the first portion of material 105 against the upper surface 157 of the flat portion 140. The component can compress the bottom side 153 of the flat portion 140 against the bottom surface 195 of the second portion of material 105. The component can compress the surface of the compressed portion 189 of the second piece of material against the inner surface 135 of the second lip 120.

The visor 100 may not include a stiffening rod. The visor 100 can lack a stiffening rod. A stiffening rod may be absent from the visor 100. Instead of including a rode or rods inserted through the visor 100. The visor 100 may be rigid or stiff in view of the double stack of material 105. The visor 100 may be rigid or still in view of one or more substrate layers in the first and second portions of material 105. Thus, the visor 100 may not include or lack a stiffening rod because the material 105 from the reused headliner can provide structural integrity or support to the visor 100. The visor 100 lacking the stiffening rod can be lighter than a visor with a stiffening rod. For example, the visor 100 of this technical solution that lacks the stiffening rod can be at least 5% lighter, 10% lighter, 15% lighter, 20% lighter or more as compared to a visor that uses a stiffening rode to provide structural integrity or other support to the visor. By providing a lighter sun visor 100 with satisfactory structural integrity, this technical solution can reduce the weight of a vehicle, thereby reducing the amount of energy used by the vehicle or increasing the range of the vehicle.

Figure 2:
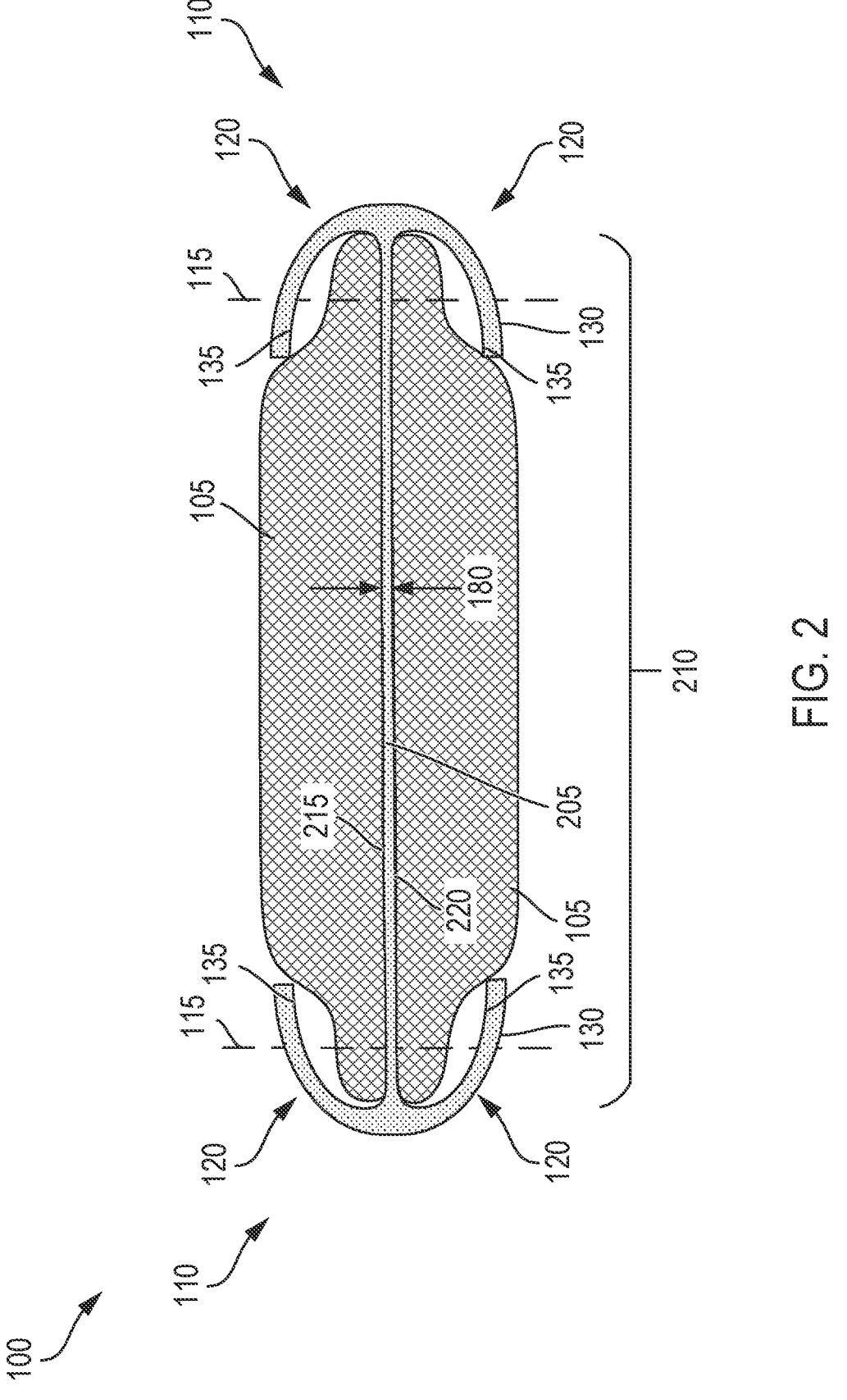
FIG. 2 is an example visor including a plate that couples a first piece of material and a second piece of material.

FIG. 2, among others, depicts the example visor 100 including a plate 205 that couples the first portion of material 105 and the second portion of material 105. The component 110 can include the plate 205 and lips 120. The plate 205 and the lips 120 can be integrally formed, or can be separate pieces joined together. The component 110 can be an injection molded component (e.g., cube molding, die casting, gas-assisted injection molded, liquid silicone rubber injection molding, metal injection molding). For example, the component 110 can be an injection molded polypropylene component. The component 110 can be carved or cut from a material. For example, the component 110 can be formed from a metal (e.g., aluminum, brass, copper) or wood (e.g., oak, maple, cherry). The component 110 can be a rigid component with little or no flex. The plate 205 can extend from lips 120 on a first side of the visor 100 to lips 120 on a second side. The plate 205 can extend between lips 120 on multiple sides of the visor 100. For example, the plate 205 can extend between lips 120 on a first lateral side of the visor 100, a second lateral side of the visor 100, a third lateral side of the visor 100, or a fourth lateral side of the visor 100.

The plate 205 can be a prismatic shape, a rectangular solid shape, a cylindrical shape, a hexagonal solid shape, a board shape, a plate shape. The plate 205 can extend a length 210 of the first portion of material 105 and the second piece of material 105. The length 210 can be 120 to 130 millimeters. The length 210 can be 110 to 150 millimeters. The length can be less than 210 millimeters. The length 210 can be greater than 150 millimeters. The plate 205 can have a rectangular solid shape, a prismatic shape, a diamond shape, or a hexagonal shape. The plate 180 can have a width 180. The width 180 of the plate 205 can be one millimeter to two millimeters. The width 180 of the plate 205 can be half a millimeter to two and a half millimeters. The width 180 of the plate 205 can be less than half a millimeter. The width 180 of the plate 205 can be greater than two and a half millimeters.

The first piece of material 105 and the second piece of material 105 can be coupled to the plate 205. For example, the first portion of material 105 and the second portion of material 105 can be frictionally coupled, glued, adhered, nailed, stitched, or stapled to the plate 205. For example, the first portion of material 105 and the second portion of material 105 can be inserted, slid, or disposed in the component 110. For example, the first portion of material 105 can be slid between an inner surface 135 of upper lips 120 and an top surface 215 of the plate 205. The first portion of material 105 can be slid between an inner surface 135 of lower lips 120 and a bottom surface 220 of the plate 205. The inner surface 135 of the lips 120 can apply a force against the compressed sections 189 or the curved sections 187 of the first portion of material 105 and the second portion of material 105. Furthermore, the top surface 215 of the plate 205 can couple with the bottom surface 195 of the first portion of material 105. The bottom surface 220 of the plate 205 can couple with the bottom surface 195 of the second portion of material 105.

Figure 3:
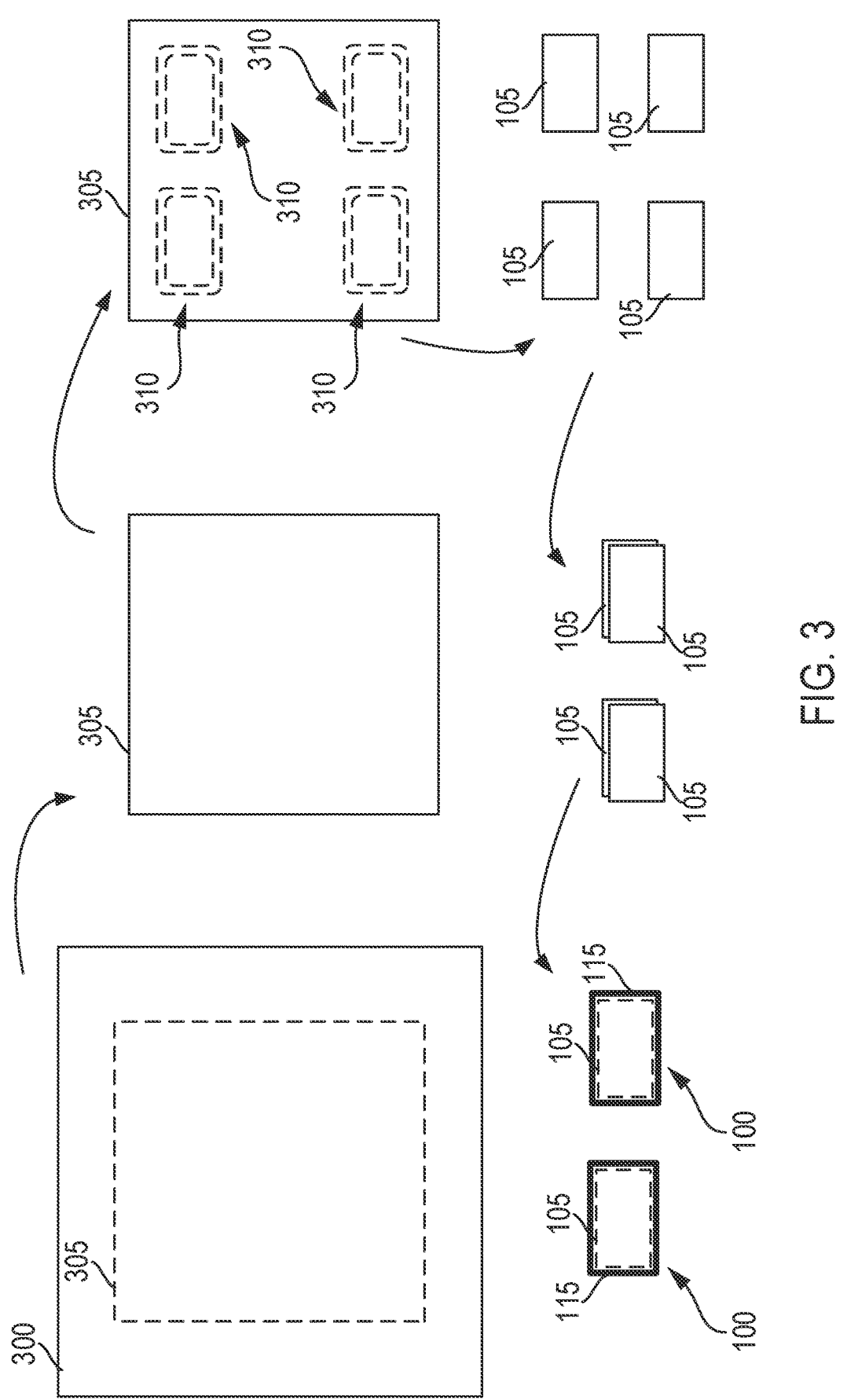
FIG. 3 is example pieces of material for constructing a visor.

FIG. 3, among others, depicts example pieces of material for the visor 100 formed from a headliner 300 of a vehicle are shown. During a manufacturing or assembly process of a vehicle, a material 300, such as a headliner 300, can be applied to inner surfaces of the vehicle, such as the floor, walls, or ceilings. However, the material 300 can be cut into a shape that conforms with the inner surfaces of the vehicle. The vehicle can have openings, such as sun roofs, moon roofs, doors, windows, or other openings. Sections of material 305 can be cut out of the material 300 to form the various openings. These sections of material 305 can be cut with a water cutting apparatus, a laser cutting apparatus, or an apparatus with a sharp component (e.g., knife, scissors, grinder). The section of material 305 can be scrap material. However, instead of discarding the section of material 305, or completely discarding the section of material 305, the section of material 305 can be used to form visors for a vehicle, e.g., the same vehicle that the headliner 300 is formed or another vehicle.

The section of material 305 can be compressed. For example, the section of material 305 can have sections 310 compressed. The section of material 305 can be compressed before or after the section of material 305 is cut from the material 300. For example, during manufacturing of the headliner 300 of the vehicle, the material 305 can be compressed around an outer boundary of the section of material 305. As part of the process of compressing the outer boundary of the material 300, the sections 310 can also be compressed. The sections 310 can be hollow rectangular shapes. The sections 310 can be defined by an inner shape, e.g., inner rectangular shape, that is not compressed, and an outer shape, e.g., an outer rectangular shape. Material between the inner and the outer rectangular shape can be compressed. The compression of the section of material 305 can form the compressed sections 189 and the curved sections 187 of the first portion of material 105 and the second portion of material 105. The rectangular shapes can have pointed or curved corners.

After the sections 310 are compressed, the portions of material 105 can be cut. The pieces of material 310 can be cut such that the outer edges of the portions of material 105 are compressed. The portions of material 105 can be cut into rectangular shapes. The rectangle defining the outer boundary of the portions of material 105 can be located between the inner and outer rectangles defining the compressed sections 310. The portions of material 105 can be cut from the section of material 305 before or after the section of material 305 is cut from the material 300. Four portions of material 105 are shown to be cut in FIG. 3. However, any number of portions of material 105 can be cut from the section of material 305. For example, one, two, three, four, five, or any other number of portions of material 105 can be cut from the section of material 305. The portions of material 105 can all be cut from the same piece of material 305 that is cut out of the material 300 to form an opening in the vehicle. One or more of the portions of material 105 can be cut from different sections of material 305 that are cut from materials 300 to form openings in different vehicles or different openings in a single vehicle.

The shapes defined by the sections 310 can be the same or similar shape. When the sections of material 105 are cut or formed from the sections 310, the sections 310 can be the same shape. For example, the first portion of material 105 can have the same shape as the second portion of material 105. When the first portion of material 105 and the second piece of material 105 are joined, coupled, or adhered, the edges 185 of the first portion of material 105 and the second piece of material 105 can be aligned.

The portions of material 105 can be paired together. One or multiple portions of material 105 can form a single visor 100. For example, the component 110 can be applied to the outer edges 185 of one portion of material 105 to hide or cover the edge 185 of the one portion of material 105. Two or more portions of material 105 can together form one visor 100. For example, two portions of material 105 can be stacked one on top of each other. The portions of material 105 can be stacked such that bottom surfaces 195 of the portions of material 105 are stacked on top of one another. For example, the portions of material 105 can be stacked such that the bottom surfaces 195 of the two portions of material 105 are closer than the top sides 197 of the two portions of material 105. A glue or adhesive can be applied to one or both bottom surfaces 195 of the portions of material 105. The bottom surfaces 195 of the two portions of material 105 can be joined together via the glue or adhesive after or as the adhesive or glue cures or hardens.

The two portions of material 105 can be coupled to a plate 205. For example, the first portion of material 105 can be slid into a space between a top surface 215 of the plate 205 and lips 120 of the component 110. The first portion of material 105 can be slid into the space such that the bottom surfaces 195 of the first portion of material 105 contacts or couples with the top surface 215 of the plate 205. The second portion of material 105 can be slid into a space between a bottom surface 220 of the plate 205 and lips 120 of the component 110. The first portion of material 105 can be slid into the space such that the bottom surfaces 195 of the second portion of material 105 contacts or couples with the bottom surface 220 of the plate 205.

Figure 4:
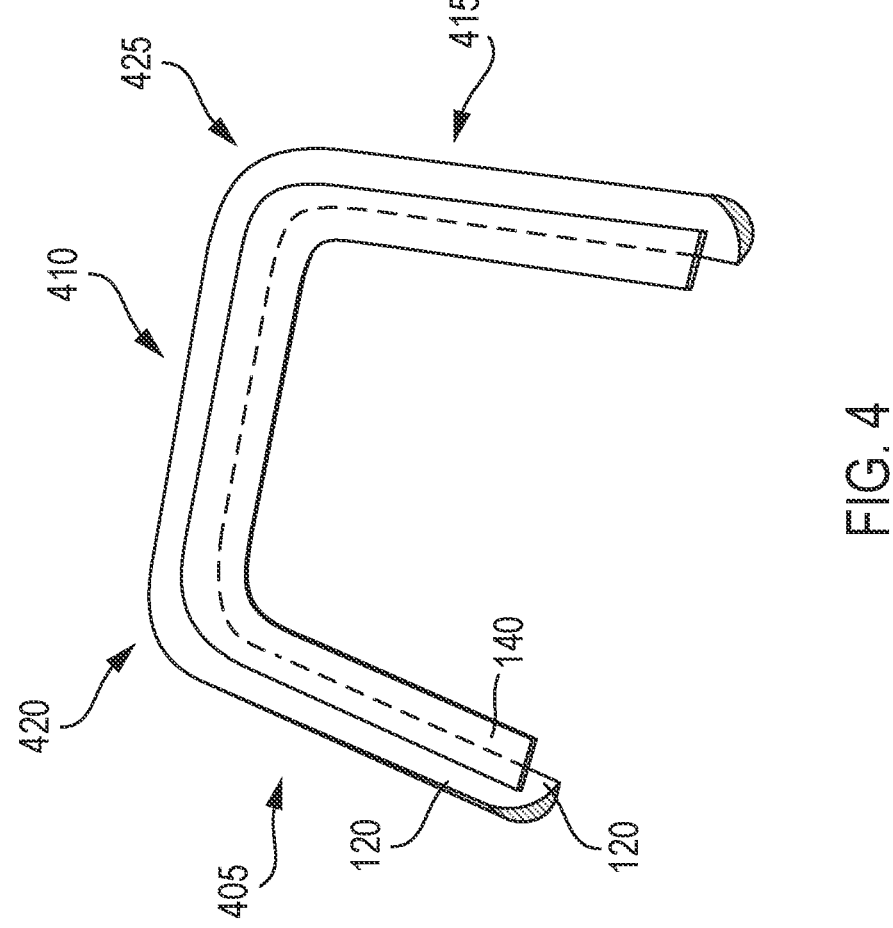
FIG. 4 is an example component that couples a first piece of material and a second piece of material to form a visor.
Figure 4:

FIG. 4, among others, depicts the component 110 that couples the first portion of material 105 and the second portion of material 105 to form the visor 100. FIG. 4 illustrates a perspective view of the component 110. The component 110 is shown to include lateral sides 405, 410, and 415. Although not shown, the component 110 can include a lateral side opposite the lateral side 410 coupling the lateral side 405 and the lateral side 415. The lateral sides 405-415 of the component 110 can be formed by the lips 120. The component 110 can be a flexible material that is bent or applied around an outer boundary of the first and second portions of material 105. For example, the component 110 can be bent around the first and second portions of material 105 to form a rectangular shape. The rectangular shape of the component 110 can have corners 420 and 425 corresponding to corners of the first and second portions of material 105. The component 110 can be formed completely or partially around the first and second portions of material 105 and can include one, two, three, or four corners. The corners can be pointed or curved.

The component 110 can be applied in a single section or multiple sections around the first and second portions of material 105. For example, the component 110 can be a single section applied around the outer edges 185 of the first and second portions of material 105. Two ends of the component 110 can meet or overlap. The component 110 can include multiple sections. The end of a first section and an end of a second section can meet or overlap. The sections can be applied end to end around some or all of the outer edge 185 of the first and second portions of material 105. The adhesive or glue applied to the first and second portions of material 105 and the flat section 140 can couple the first and second portions of material 105 and the component 110.

Figure 5:
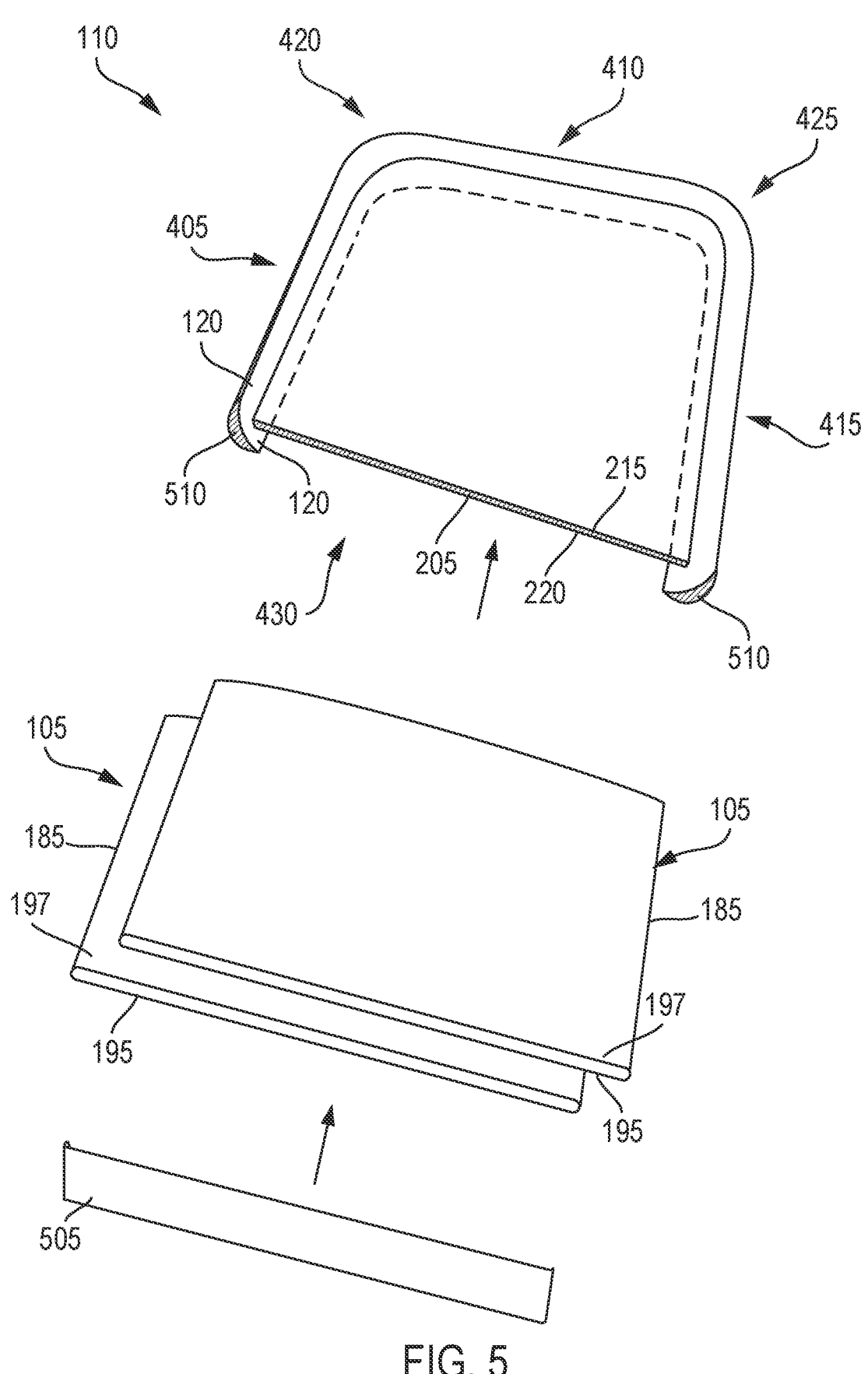
FIG. 5 is an example component including a plate that couples a first piece of material and a second piece of material to form a visor.

FIG. 5, among others, depicts the example component 110 including the plate 205 that couples the first portion of material 105 and the second portion of material 105 to form the visor 100. The plate 205 can be a rectangular shape extending between the sides 405, 410, 415, and 430. The plate 205 can have curved or pointed corners. The first portion of material 105 and the second portion of material 105 can be inserted into the component 110. The first portion of material 105 can be inserted on top of the plate 205. The second portion of material 105 can be inserted under the plate 205. For example, one side 430 of the component 110 can be open, i.e., the plate 205 may not include any lip 120 on the one side of the component 110. The first portion of material 105 an the second portion of material 105 can be inserted into the component on the open side. The first portion of material 105 can be inserted into an open space between the top surface 215 of the plate 205 and the upper lips 120. The second portion of material 105 can be inserted into an open space between the bottom surface 220 and the lip 120.

The plate 205 can extend between the lateral sides of the component 110. For example, the plate 205 can extend from the first lateral side 405 to the second lateral side 415, to the third lateral side 410, and to the open side 430. The upper lips 120 can extend from the top surface 215 on an outer boundary of the plate 205 towards a center of the plate. The upper lips 120 can extend from a lateral side 405 of the component 110 towards an opposite lateral side, e.g., the lateral side 415. The lower lips 120 can extend from the bottom surface 220 on an outer boundary of the plate 205 towards a center of the plate. The lower lips 120 can extend from a lateral side 405 of the component 110 towards an opposite lateral side, e.g., the lateral side 415.

The component 110 can include an open side 430. The open side 430 may not include any lips 120. Because the open side 430 does not include any lips 120, the portions of material 105 can be inserted into the component 110 through the open side 430. The first portion of material 105 can be inserted into the component 110 between the top surface 215 of the plate 205 and the top lip 120, which surround at least a portion of an outer edge of the plate 205. For example, the top lip 120 can surround the plate 205 on the lateral side 405, the lateral side 410, and the lateral side 415. The top lip 120 may not surround the plate 205 on the open side 430. The second portion of material 105 can be inserted into the component 110 between the bottom surface 220 of the plate 205 and the lower lip 120, which surround at least a portion of an outer edge of the plate 205. For example, the lower lip 120 can surround the plate 205 on the lateral side 405, the lateral side 410, and the lateral side 415. The lower lip 120 may not surround the plate 205 on the open side 430.

An end or end component 505 can be coupled to the visor 100. The end component 505 can be fixed or coupled to the visor 100 to cover the open side 430. The end component 505 can be fixed or coupled to the open side 430 of the visor 100. After the first portion of material 105 and the second portion of material 105 are inserted into the component 110, an end or end component 505 can be fixed or coupled to the lips 120. The end component 505 can be fixed or coupled to the plate 205. For example, the end 505 can be a curved or flat portion forming two lips 120 for the open side of the component 110. The end 505 can be fixed to, or make contact with, end surfaces 510 of the lips 120 on the lateral side 405 and the lateral side 415 of the component 110. The end 505 can be fixed to the end surfaces 510 via an adhesive, a frictional force, with the lateral side 405 and the lateral side 415. The end 505 may not be fixed to the component 110 and can instead be fixed to the first portion of material 105 and the second portion of material 105. For example, the end 505 can be fixed to the first portion of material 105 or the second portion of material 105 with a glue, adhesive, thread, stitch, snap, or connector. For example, the end 505 can be fixed to the first portion of material 105 and the second portion of material 105 via a thread stitched or inserted through the end 505, the first portion of material 105, and the second portion of material 105 along the boundary 115.

Figure 6:
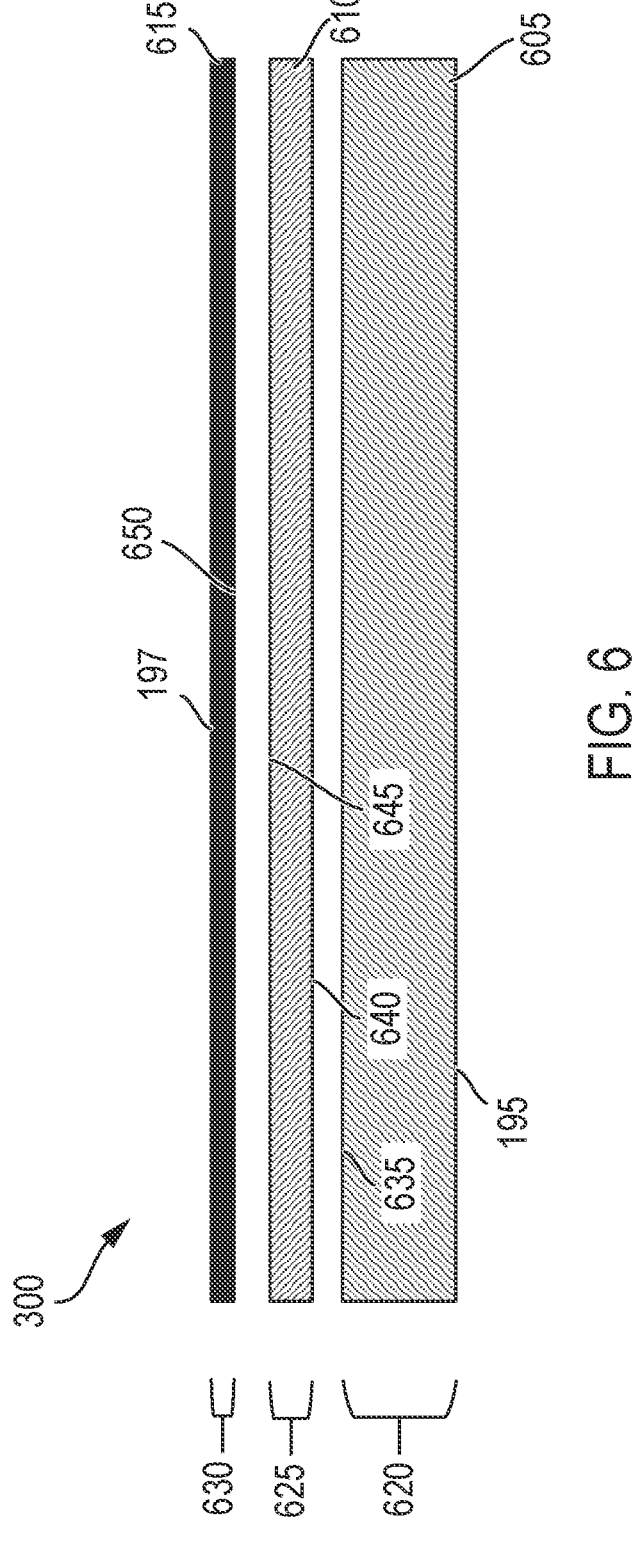
FIG. 6 is an example headliner material of a vehicle including multiple layers.

FIG. 6, among others, depicts the example headliner material 300 of a vehicle including multiple layers. FIG. 6 illustrates a cross-section view of the headliner material 300. The layers of the material 300 are shown spaced apart for illustrative purposes. The material 300 can be a material stack. For example, the material 300 an be a stack of multiple layers of material. The first portion of material 105, the second portion of material 105, or the section of material 305 can be formed from, be, or include, the stack of material 300.

The layers of the material 300 can be stacked, glued, fixed, or coupled to each other. The material 300 can include one, two, three, four, or any other number of layers. For example, the first layer 605 can be a substrate layer. The first layer 605 can be a rigid layer or a layer that resists or limits bending or flexing. The first layer 605 can be a plywood, polypropylene, fiberglass, aluminum, copper, or other substrate. The upper surface of the first layer 605 can be a scrim reinforced polyethylene. The surface 635 of the first layer 605 can be an adhesive that couples the first layer 605 with the second layer 610. The first layer 605 can has a thickness 620 of two to three millimeters. The first layer 605 can have a thickness 620 of one to four millimeters. The first layer 605 can have a thickness less than one millimeter. The first layer 605 can have a thickness greater than four millimeters.

The second layer 610 can be stacked on the first layer 605. The second layer 610 can be a foam layer. The second layer 610 can be or include foam rubber, cellular rubber, sponge rubber, or expanded rubber. The second layer 610 can include a first side or surface 640. The side 640 of the second layer 610 can be fixed to the side 635 of the first layer 605 via the adhesive applied to the first layer 605. The second layer 610 can have a thickness 625. The thickness 625 can be three to five millimeters. The thickness 625 can be two to six millimeters. The thickness can be less than two millimeters. The thickness 625 can be more than six millimeters.

The third layer 615 can be stacked on the second layer 610. The third layer 615 can be a fabric or material disposed over a side or surface 645 of the second layer 610. The third layer 615 can be a fabric layer. For example, a side or surface 650 of the third layer 615. The third layer 615 can be fixed, sewn, adhered, glued, or otherwise coupled to the layer 610. The layer 615 can have a thickness 630. The thickness 630 can be a half millimeter to one and a half millimeters. The thickness 630 can be a quarter millimeter to one and three quarters millimeters. The thickness 630 can be less than a quarter millimeter. The thickness 630 can be greater than one and three quarters millimeters.

The first and second portions of material 105 can be stacked together such that the substrate layers 605 are coupled together. For example, an adhesive can be applied to a substrate layer 605 of one or both of the first portion of material 105 and the second portion of material 105. The substrate layer 605 of the first portion of material 105 and the substrate layer 605 of the second portion of material 105 can be pressed, touched, or pushed together. The adhesive can fix or couple the substrate layer 605 of the first portion of material 105 and the second portion of material 105. The substrate layer 605 of the first portion of material 105 can be coupled, e.g., frictionally coupled, to the upper surface 215 of the plate 205. The substrate layer 605 of the second portion of material 105 can be coupled, e.g., frictionally coupled, to the bottom surface 220 of the plate 205.

Figure 7:
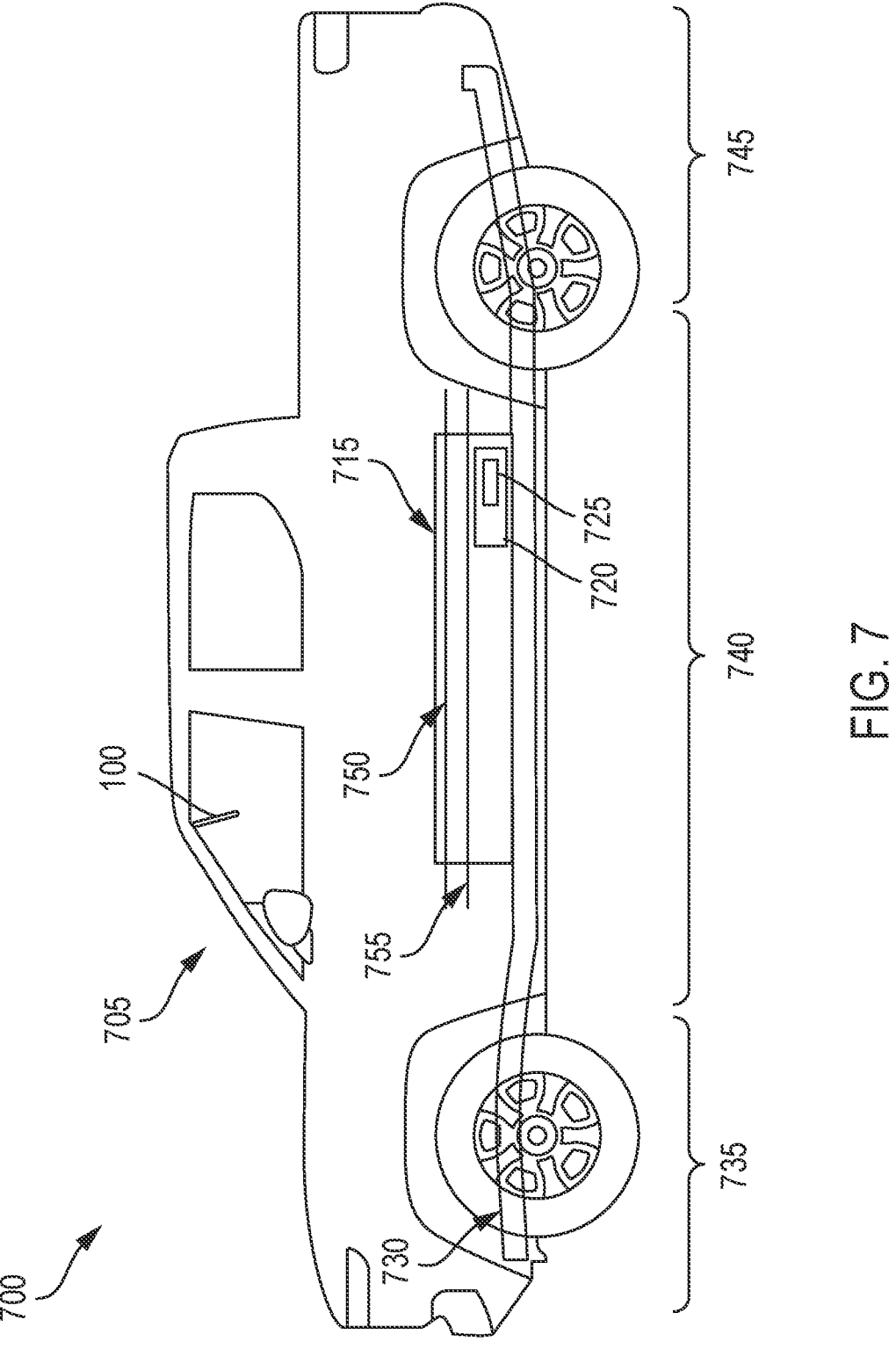
FIG. 7 is an example vehicle including a visor.

FIG. 7, among others, depicts an example vehicle 705 including a battery pack 715. FIG. 7 depicts an example cross-sectional view 700 of an electric vehicle 705 installed with at least one battery pack 715. Electric vehicles 705 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 710 can also be used as an energy storage system to power a building, such as a residential home or commercial building. Electric vehicles 705 can be fully electric or partially electric (e.g., plug-in hybrid) and further, electric vehicles 705 can be fully autonomous, partially autonomous, or unmanned. Electric vehicles 705 can also be human operated or non-autonomous. Electric vehicles 705 such as electric trucks or automobiles can include on-board battery packs 715, batteries 720 or battery modules 720, or battery cells 725 to power the electric vehicles. The electric vehicle 705 can include a chassis 730 (e.g., a frame, internal frame, or support structure). The chassis 730 can support various components of the electric vehicle 705. The chassis 730 can span a front portion 735 (e.g., a hood or bonnet portion), a body portion 740, and a rear portion 745 (e.g., a trunk, payload, or boot portion) of the electric vehicle 705. The battery pack 715 can be installed or placed within the electric vehicle 705. For example, the battery pack 715 can be installed on the chassis 730 of the electric vehicle 705 within one or more of the front portion 735, the body portion 740, or the rear portion 745. The battery pack 715 can include or connect with at least one busbar, e.g., a current collector element. For example, the first busbar 750 and the second busbar 755 can include electrically conductive material to connect or otherwise electrically couple the battery 715, the battery modules 720, or the battery cells 725 with other electrical components of the electric vehicle 705 to provide electrical power to various systems or components of the electric vehicle 705.

The vehicle 705 can include at least one visor 100. The visor 100 can be a sun visor that blocks sun light from the eyes of a driver, passenger, or occupant of the vehicle 705. The vehicle 705 can include at least one visor 100 on a driver side of the vehicle 705. The vehicle 705 can include at least one visor 100 on a passenger side of the vehicle 705. The vehicle 705 can include visors 100 in the driver area, a passenger area, or a rear passenger area. The visors 100 can be mounted to a ceiling of the vehicle 705. The visors 100 can be coupled with a hinge or bracket that allows the visor 100 to move between a position flush with the ceiling of the vehicle 705 to an angled position. The visor 100 can move between a position flush or parallel with the ceiling to a maximum angled position that is between one hundred twenty degrees and one hundred fifty degrees. The maximum angled position can be between one hundred degrees and one hundred eighty degrees. The maximum angled position can be less than one hundred degrees. The visor 100 can rotate forward and backwards, i.e., towards the front portion 735 or the rear portion 745 of the vehicle. The visor 100 can rotate on the hinge sideways. For example, the visor 100 can be rotated towards a passenger side door or a driver side door.

Figure 8:
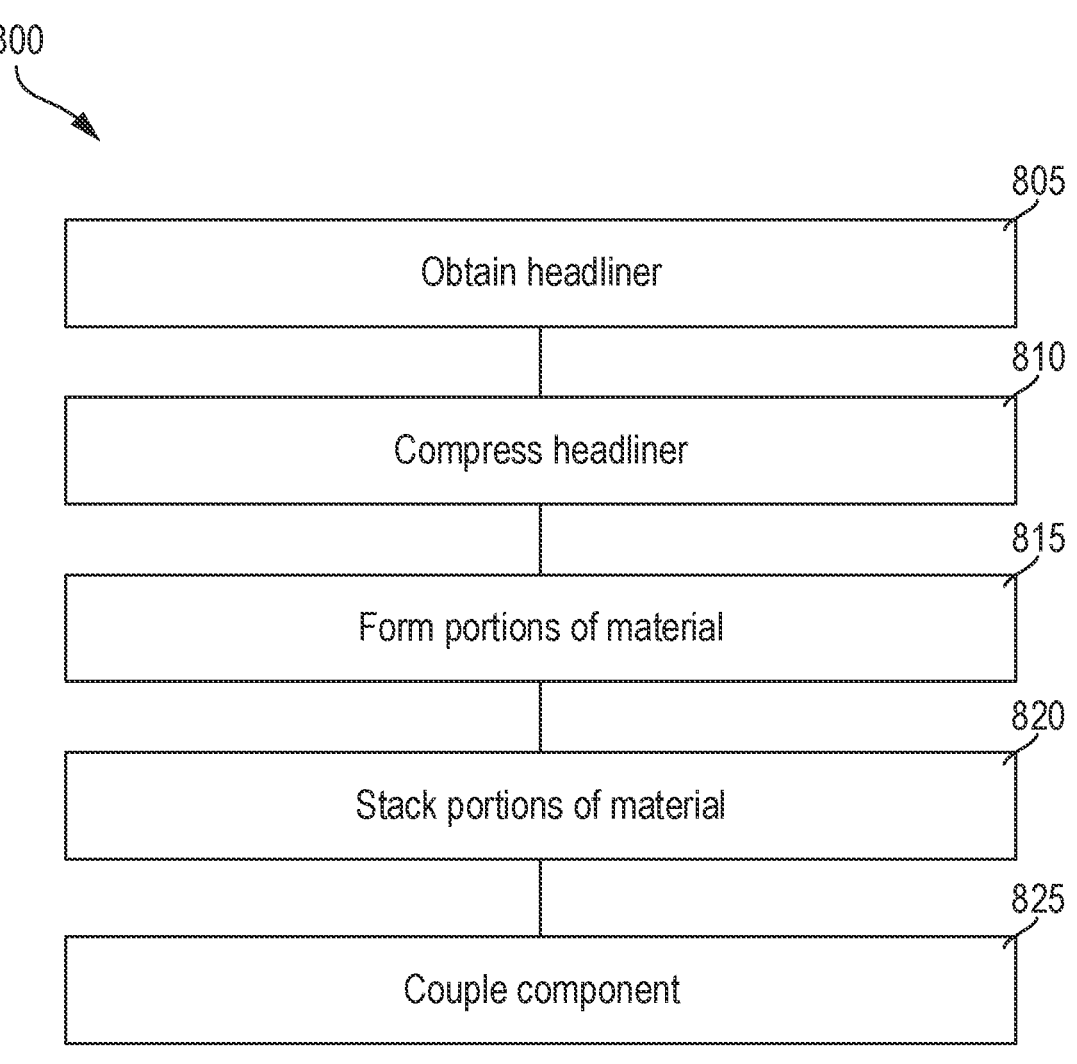
FIG. 8 is an example method of constructing a visor.

FIG. 8, among others, depicts an example method 800 of constructing the visor 100. The method 800 can be or include a method of constructing, manufacturing, assembling, or creating the visor 100, the vehicle 705, or the headliner 300 or a combination thereof. For example, the method 800 can be a process integrating the manufacture or assembly of the visor 100, the vehicle 705, or the headliner 300. At least a portion of one ACT of the method 800 can be performed by a manufacturing apparatus or system. At least a portion of one ACT of the method 800 can be performed by at least one robotic assembly, arm, conveyor, or autonomous or user controlled system. At least a portion of one ACT of the method 800 can be performed by a manufacturing or assembled person or individual. At least a portion of one ACT of the method 800 can be controlled by a computer system, data processing system, or server that operates an apparatus or actuator to implement at least a portion of one ACT of the method 800. The method 800 can include an ACT 805 of obtaining a headliner. The method 800 can include an ACT 810 of compressing a headliner. The method 800 can include an ACT 815 of forming portions of material. The method 800 can include an ACT 820 of stacking the portions of material. The method 800 can include an ACT 825 of coupling a component.

The ACT 805 of the method 800 can include obtaining the headliner 300. For example, the ACT 805 can include retrieving, cutting, forming, or constructing the headliner 300, or a piece of material used to form the headliner 300. For example, a water pressure cutting apparatus or a laser cutting apparatus can perform cutting the headliner 300. At least one apparatus that manipulates, moves, or controls a scissors, knife, or other sharp object or component can cut the headliner 300. A person or individual can cut the headliner 300 with a scissors, knife, or other sharp object or component. The method 800 can include cutting a shape from the headliner 300 to form an opening for the vehicle 705. The shape cut from the headliner can be completely within outer boundaries of the headliner 300. For example, the cut in the headliner 300 may be contained completely within the headliner 300 and may not include a cut into the headliner 300 from any of the sides of the headliner 300. The shape can be cut from the headliner 300 by cutting from one of the sides of the headliner 300. The shape cut from the headliner 300 can form an opening for the vehicle 705, such as a sun roof, a moon roof, a window, or a door. The shape cut from the headliner 300 can be the section of material 305. The method 800 can include cutting the section of material 305 from a headliner 300 of the vehicle 705 or a headliner 300 to be installed in the vehicle 705.

The ACT 810 of the method 800 can include compressing the headliner 300. For example, a press, clamp, or other system can compress a shape into the headliner 300. For example, a compressing force can be applied on at least one side of the headliner 300. For example, compressing the headliner 300 can compress the layer 610. For example, because the layer 610 can be a foam layer, the layer 610 can compress with the pressure applied to the headliner 300. The method 800 can include compressing the headliner 300 or the section 305 cut from the headliner 300. The compressing of the section 305 of the headliner 300 before or after the section 305 is cut from the headliner 300.

The method 800 can include compressing at least one shape into the section 305. The method 800 can include compressing the portion 310 of the section of material 305 between a boundary defined by an inner rectangular shape and a boundary defined by an outer rectangular shape. For example, at least one hollow rectangular shape can be compressed into the headliner 300. The hollow rectangular shape can include a hollow or inner portion defined by a first rectangle. The hollow rectangular shape can be defined by a second rectangle. The first rectangle can be completely contained within the second rectangle. The space between the first rectangle and the second rectangle can be compressed. The space within the first rectangle may not be compressed. The space outside the second rectangle may not be compressed.

The ACT 815 of the method 800 can include forming the portions of material 105. For example, the ACT 815 can include cutting one or more portions of material 105 from the section of material 305 or the headliner 300. Forming the portions of material 105 can include forming the edges 185. Forming the portions of material 105 can include forming the edges 185 from the compressed portions 310, e.g., cutting the edges 185 from the compressed portions 310. The portions of material 105 can be cut from the section of material 305 before or after the section of material 305 is cut from the headliner 300. The portions of material 105 can be cut from the section of material 305 before or after the section of material 305 is compressed. For example, after the sections 310 are compressed, the portions of material 105 can be cut from the section of material 305. Any number of portions of material 105 can be cut from the section of material 305. For example, one, two, three, four, or more portions of material 105 can be cut from the section of material 305. If a vehicle includes two visors 100, four portions of material 105 can be cut so that pairs of the portions of material 105 can form each visor 100.

For example, the sections of material 105 can be cut from the section of material 305 by cutting along an outer boundary of the compressed sections 310. For example, the sections of material 105 can be cut from the section of material 305 by cutting around a shape defining an outer edge of the compressed sections 310, e.g., an outer rectangular shape. The portions of material 105 can be cut from the section of material 305 by cutting within the outer boundary of the compressed sections 310. For example, the portions of material 105 can be cut between an inner rectangle and an outer rectangle defining the compressed sections 310.

At ACT 820, the method 800 can include stacking the portions of material 105. For example, assembling the visor 100 can include pairing the portions of material 105. The method 800 can include stacking the first and second portions of material 105. The portions of material 105 can be stacked one on top of each other, such that the edges 185 of the portions of material 105 are located on a plane perpendicular with the top sides 197 or the bottom surfaces 195 of the first piece of material 105 or the second portion of material 105. The first and second portions of material 105 can be stacked. The first and second portions of material 105 can be stacked back to back such that the bottom surface 195 of the first portion of material 105 is stacked on the bottom surface 195 of the second portion of material 105. The first portion of material 105 and the second portion of material 105 can be stacked such that first portion of material 105 and the second portion of material 105 reflect each other across a boundary separating the first portion of material 105 and the second portion of material 105, e.g., the space 165 or the plate 205.

Assembling the visor 100 can include fixing, coupling, gluing or adhering the first portion of material 105 with the second portion of material 105. For example, an adhesive can be applied to the bottom surface 195 of the first portion of material 105 or the bottom surface 195 of the second portion of material 105. The first and second portions of material 105 can be stacked. The first and second portions of material 105 can be stacked one on top of the other. For example, the first portion of material 105 and the second portion of material 105 can be stacked on each other such that the adhesive couples the bottom surface 195 of the first portion of material 105 to the bottom surface 195 of the second portion of material 105. The bottom surface 195 of the first portion of material 105 can be stacked on the bottom surface 195 of the second portion of material 105. The first and second portions of material 105 can be stacked after the adhesive is applied. The first and second portions of material 105 can be stacked and the adhesive inserted or injected between the first and second portions of material 105.

At ACT 825, the method 800 can include coupling the component 110. For example, the component 110 can be coupled with the portions of material 105. The method 800 can include coupling, fixing, or connecting the component 110 with the portion of material 105 or the second portion of material 105 to form the visor 100, the component 110 covering the outer edge 185 of the portion of material 105 or the second portion of material 105. The component 110 can be coupled to the first portion of material 105 and the second portion of material 105 after or while the first portion of material 105 and the second portion of material 105 are stacked. Assembling the visor 100 can include applying, connecting, coupling, or fixing the component 110 around an outer boundaries 185 of the first portion of material 105 and the second portion of material 105. For example, the component 110 can be a flexible material that includes lips 120 and a flat section 140. The flat section 140 can extend from the lips 120 into a space 165 between the bottom surface 195 of the first portion of material 105 and the bottom surface 195 of the second portion of material 105. An adhesive or glue in the space 165 can couple the flat portion 140 to the bottom surface 195 of the first portion of material 105 and the bottom surface 195 of the second portion of material 105.

The method 800 can include adhering the first portion 105 with or to the second portion 105. For example, the bottom surface 195 of the first portion can be adhered to the bottom surface 195 of the second portion 105. The bottom surface 195 of the first portion 105 and the bottom surface 195 of the second portion can each correspond to a bottom side of the material 300 or the section of material 305.

The method 800 can include stitching the visor 100. Stitching the visor 100 can couple the component 110 to the portion of material 105. Assembling the visor 100 can include applying a stich or thread to the component 110, the first portion of material 105, and the second portion of material 105. A thread or stich can be applied along a boundary 115. The thread can be inserted through an upper lip 120, through the first portion of material 105, through the flat section 140, and through the lower lip 120. The thread can then be inserted through the lower lip 120, through the second portion of material 105, through the flat section 140, through the first portion of material 105. The thread can be stitched around at least part of the outer boundary of the visor 100. For example, the visor 100 may have a rectangular shape. The thread can be stitched in a rectangular shape partially or completely around the visor 100 within the rectangle defining the outer boundary of the visor 100.

The stitching can be done after the portions of material 105 are stacked and coupled to the component 110. Stitching the portions of material 105 and the component 110 can couple the portions of material 105 with the component 110. For example, while stitching, a thread can be inserted upwards and downwards through the first portion of material 105 and the second portion of material 105. For example, while stitching, a thread can be inserted upwards and downwards through the lip 120, the first portion of material 105, the second portion of material 105, and the lower lip 120. For example, while stitching, a thread can be inserted upwards and downwards through the lip 120, the first portion of material 105, the flat section 140, the second portion of material 105, and the lower lip 120.

Coupling the component 110 can include inserting the first portion of material 105 and the second portion of material 105 into the component 110. For example, the first portion of material 105 can be inserted into the component 110 from an open side, e.g., a side without any lips 120. The first portion of material 105 can be inserted into a space between a top surface 215 of the plate 205 and an inner surface 135 of the top lips 120. The second portion of material 105 can be inserted into a space between a bottom surface 220 of the plate 205 and an inner surface 135 of the lower lips 120. The first portion of material 105 and the second portion of material 105 can be fixed to the plate 205 via a frictional force, an adhesive, a glue, or a stich.

The method 800 can include stitching the visor 100. For example, the first portion of material 105 can be stitched to the second portion of material 105. Stitching the first portion of material 105 and the second portion of material 105 can include inserting a thread through the first piece of material and the second portion of material 105 in a pattern. For example, the stitches can be made around an outer boundary of the visor 100. For example, the stitches can be made in a rectangular pattern or shape around the visor 100. The stitches can be made within an outer rectangular boundary of the visor 100. The stitches can be made around an outer boundary of the visor 100 a constant distance from the outer boundary of the visor 100. The stitches can be made around the outer boundary of the visor 100 at a varying distance from the outer boundary of the visor 100, e.g., in a zig-zag pattern, a undulating pattern, a sine or cosine pattern.

The method 800 can include installing the headliner 300 in the vehicle 705. The headliner 300 can be installed into a ceiling of the vehicle 705. For example, an adhesive, glue, bolts, nuts, washers, snaps, nails, connectors, staples, clamps, or other elements or components can couple or fix the headliner 300 to the ceiling of the vehicle. Furthermore, the visor 100 can be installed in the vehicle 705. The visor 100 can be installed on the headliner 300 and installed in the vehicle 705. The visor 100 can be fixed to a bracket, hinge, or other component or apparatus that couples the visor 100 to the ceiling of the vehicle 705. The visor 100 can be fixed to the bracket, hinge, or other component via a nut, bolt, screw, nail, snap, or other connector. The bracket can be fixed to the ceiling of the vehicle 705 via a weld, a bolt, a snap, a screw, a nut, a connector.

Figure 9:
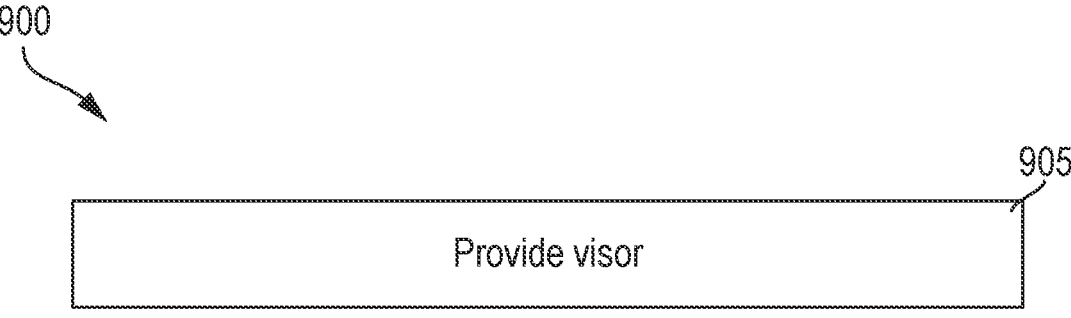
FIG. 9 is an example method of providing a visor.

FIG. 9, among others, depicts an example method 900 of providing a visor 100. The method 900 can include an ACT 905. The ACT 905 can include providing the visor 100. Providing the visor 100 can include disposing the visor 100 in a vehicle 705. Providing the visor 100 can include installing the visor 100 within a vehicle 705. Providing the visor 100 can include manufacturing or assembling the visor 100. The visor 100 can include a first portion of material 105 stacked on a second portion of material 105. The component 110 can surround outer edges 185 of the first portion of material 105 and the second portion of material 105. For example, lips 120 of the component 110 can surround the outer edges 185 of the first portion of material 105 and the second portion of material 105. The first portion of material 105 and the second portion of material 105 can be separated by a space 165. The first portion of material 105 and the second portion of material 105 can be coupled to a plate 205.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations,"

"one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

In some examples, the scrap material from forming the headliners can be used for other purposes. For example, the scrap material can be used to construct arm rests, head rests, cushion, or other furnishings for a vehicle. In some examples, the visor discussed herein is formed from material that is not scrap or leftover material from manufacturing a headliner of a vehicle. For example, a sheet of material used for the headliner can be cut to form the headliner and the visor. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A method, comprising:
obtaining a section of material from a piece of material used to form a headliner of a vehicle;

forming a first portion of material and a second portion of material from the section of material;
stacking the first portion of material with the second portion of material; and
coupling a component with the first portion of material and the second portion of material to form a visor of the vehicle, the component applied as a single section, the single section comprising a plurality of sub-components including an upper lip covering an outer edge of the first portion of material, a lower lip covering an outer edge of the second portion of material, and a flat section extending from the upper lip and the lower lip.

2. The method of claim 1, comprising:
adhering a bottom surface of the first portion of material corresponding to a bottom surface of the section of material to a bottom surface of the second portion of material corresponding to the bottom surface of the section of material.

3. The method of claim 1, comprising:
stitching around an outer boundary of the visor to fix the component to the first portion of material and the second portion of material.

4. The method of claim 1, comprising:
stitching a thread through the upper lip of the component, through the first portion of material, through the second portion of material, and through the lower lip of the component.

5. The method of claim 1, comprising:
inserting the first portion of material into the component between a top surface of a plate of the component and the upper lip of the component surrounding an outer edge of the plate; and
inserting the second portion of material into the component between a bottom surface of the plate of the component and the lower lip of the component surrounding the outer edge of the plate.

6. The method of claim 1, comprising:
compressing a portion of the section of material between a boundary defined by an inner shape and a boundary defined by an outer shape; and
forming at least a portion of the outer edge of the first portion of material from the compressed portion.

7. The method of claim 6, comprising:
compressing a second portion of the section of material between a boundary defined by an inner shape and a boundary defined by an outer shape;
forming at least a portion of the outer edge of the second portion of material from the compressed second portion, the second portion of material formed to have a shape corresponding with a shape of the first portion of material; and
coupling the first portion of material with the second portion of material to align the outer edge of the first portion of material with the outer edge of the second portion of material.

8. A visor for a vehicle, comprising:
a first portion of material comprising a first outer edge wherein at least a portion of the first portion of material is compressed;
a second portion of material comprising a second outer edge wherein at least a portion of the second portion of material is compressed,
wherein the first portion of material is stacked on the second portion of material to align the first outer edge with the second outer edge; and
a component coupled with the first portion of material and the second portion of material to form the visor, the component applied as a single section, the single section comprising a plurality of sub-components including an upper lip, a lower lip, and a flat section extending from the upper lip and the lower lip.

9. The visor of claim 8, comprising:
a stiffening component coupled with the first portion of material and the second portion of material, the stiffening component covering the first outer edge and the second outer edge.

10. The visor of claim 8, comprising:
the component comprising:
   the upper lip at least partially surrounding the first outer edge and a top surface of the first portion of material;
   the lower lip at least partially surrounding the second outer edge and a top surface of the second portion of material; and
   the flat section extending from the upper lip and the lower lip between a bottom surface of the first portion of material and a bottom surface of the second portion of material.

11. The visor of claim 8, comprising:
the component coupled with the first portion of material and the second portion of material, comprising:
   a plate extending from a first lateral side of the component to a second lateral side of the component;
   the upper lip that extends from a top side of the plate on an outer boundary of the plate towards a center of the plate; and
   the lower lip that extends from a bottom surface of the plate on the outer boundary of the plate towards the center of the plate.

12. The visor of claim 8, comprising:
the component, comprising:
   a plate extending from a first lateral side of the component to a second lateral side of the component;
the first portion of material coupled to an upper surface of the plate; and
the second portion of material coupled to a bottom surface of the plate.

13. The visor of claim 8, comprising:
the first portion of material and the second portion of material each comprising a material stack, the material stack comprising:
   a substrate layer;
   a foam layer stacked on the substrate layer; and
   a fabric layer stacked on the foam layer.

14. The visor of claim 8, comprising:
the first portion of material comprising a plurality of layers including a substrate layer forming a bottom surface of the first portion of material; and
the second portion of material comprising a plurality of layers including a substrate layer forming a bottom surface of the second portion of material, the bottom surface of the first portion of material facing the bottom surface of the second portion of material.

15. The visor of claim 8, comprising:
the first portion of material comprising a plurality of layers including a substrate layer; and
the second portion of material comprising a plurality of layers including a substrate layer;
wherein the substrate layer of the first portion of material is coupled to an upper side of the component and the substrate layer of the second portion of material is coupled to a bottom side of the component.

16. The visor of claim 8, comprising:
the component covering the first outer edge and the second outer edge; and
a thread stitched at least partially or completely around an outer boundary of the visor, the thread stitched through the first portion of material, the component, and the second portion of material.

17. The visor of claim 8, wherein:
a plane of the first outer edge and the second outer edge is perpendicular with a bottom surface of the first portion of material, the bottom surface of the first portion of material coupled with a bottom surface of the second portion of material.

18. A method, comprising:
obtaining a section of material from a piece of material used to form a headliner of a vehicle;
forming a first portion of material and a second portion of material from the section of material;
stacking the first portion of material with the second portion of material;
coupling a component with the first portion of material and the second portion of material to form a visor of the vehicle, the component applied as a single section, the single section comprising a plurality of sub-components including an upper lip covering an outer edge of the first portion of material, a lower lip covering an outer edge of the second portion of material, and a flat section extending from the upper lip and the lower lip; and
installing the visor and the piece of material in the vehicle.

19. The method of claim 18, comprising:
compressing a portion of the section of material between a boundary defined by an inner shape and a boundary defined by an outer shape; and
forming at least a portion of the outer edge of the first portion of material from the compressed portion.

20. The method of claim 18, comprising:
stitching around an outer boundary of the visor to fix the component to the first portion of material and the second portion of material.

\* \* \* \* \*